US009541674B2

United States Patent
Manoharan et al.

(10) Patent No.: US 9,541,674 B2
(45) Date of Patent: Jan. 10, 2017

(54) PHOTONIC BALLS CONTAINING A MICROSTRUCTURE OF CORE-SHELL PARTICLES EXHIBITING ANGULARLY-INDEPENDENT STRUCTURAL COLOR

(71) Applicant: President and Fellows of Harvard College, Cambridge, MA (US)

(72) Inventors: Vinothan Manoharan, Cambridge, MA (US); Sofia Magkiriadou, Thessaloniki (GR); Jin-Gyu Park, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 194 days.

(21) Appl. No.: 14/285,977

(22) Filed: May 23, 2014

(65) Prior Publication Data
US 2014/0254017 A1    Sep. 11, 2014

Related U.S. Application Data

(63) Continuation of application No. PCT/US2012/067602, filed on Dec. 3, 2012.
(Continued)

(51) Int. Cl.
*G02B 1/00* (2006.01)
*G02B 5/28* (2006.01)
*B82Y 20/00* (2011.01)

(52) U.S. Cl.
CPC .............. *G02B 1/005* (2013.01); *B82Y 20/00* (2013.01); *G02B 5/286* (2013.01)

(58) Field of Classification Search
CPC ........... G02B 1/005; G02B 5/286; G02B 5/24; G02B 5/288; B82Y 20/00; G02F 1/167; G02F 2001/1672; G02F 2001/1678
See application file for complete search history.

(56) References Cited

U.S. PATENT DOCUMENTS

2002/0171910 A1*  11/2002  Pullen ................. G02F 1/167
                                                    359/296
2006/0132896 A1*  6/2006  Hsu .................... C09B 67/0004
                                                    359/296
(Continued)

FOREIGN PATENT DOCUMENTS

EP          1995630 A1    11/2008
WO    WO-2008/140282 A2   11/2008
WO    WO 2011010852 A2 *   1/2011  ............. G02F 1/167

OTHER PUBLICATIONS

Forster, J. D., et al., "Biomimetic Isotropic Nanostructures for Structural Coloration," Advanced Materials, vol. 22, pp. 2939-2944 (2010).
(Continued)

*Primary Examiner* — Thomas K Pham
*Assistant Examiner* — Cara Rakowski
(74) *Attorney, Agent, or Firm* — Wilmer Cutler Pickering Hale and Dorr LLP

(57) ABSTRACT

A photonic assembly for observing a preselected color includes an assembly of colloidal particles in a continuous liquid phase, the colloidal particles comprising a core scattering center and a shell layer surrounding the core, wherein the core scattering center is selected to scatter light having a predetermined wavelength, and wherein the shell has a thickness selected to provide an overall colloidal particle size that is about the same dimension as the wavelength of preselected color to be observed.

22 Claims, 15 Drawing Sheets

Related U.S. Application Data

(60) Provisional application No. 61/683,006, filed on Aug. 14, 2012, provisional application No. 61/566,301, filed on Dec. 2, 2011.

(56) References Cited

U.S. PATENT DOCUMENTS

| | | | | |
|---|---|---|---|---|
| 2007/0009562 | A1* | 1/2007 | Ikkai | A61K 8/02 424/401 |
| 2008/0291526 | A1* | 11/2008 | Lin | G02F 1/167 359/296 |
| 2009/0269579 | A1* | 10/2009 | Minaki | G02B 5/0825 428/338 |
| 2010/0102251 | A1* | 4/2010 | Ferrini | H05B 33/22 250/484.4 |
| 2011/0101387 | A1 | 5/2011 | Kinomoto | |
| 2011/0235161 | A1* | 9/2011 | Joo | G02F 1/167 359/296 |

OTHER PUBLICATIONS

Jones, M. R., et al., "Templated Techniques for the Synthesis and Assembly of Plasmonic Nanostructures," Chemical Reviews, vol. 111, pp. 3736-3827 (2011).

Kim, S. H., et al., "Microwave-Assisted Self-Organization of Colloidal Particles in Confining Aqueous Droplets," J. Am. Chem. Soc., vol. 128, pp. 10897-10904 (2006).

Moon, J. H., et al., "Electrospray-Assisted Fabrication of Uniform Photonic Balls," Advanced Materials, vol. 16, No. 7, pp. 605-609 (2004).

Neeves, A. E. and Birnboim, M. H., "Composite structures for the enhancement of nonlinear-optical susceptibility," J. Opt. Soc. Am. B., vol. 6, No. 4, pp. 787-796 (Apr. 1989).

Perro, A., et al., "Design and Synthesis of Model Transparent Aqueous Colloids with Optimal Scattering Properties," Langmuir Letter, vol. 25, No. 19, pp. 11295-11298 (2009).

Yi, G. R., et al., "Generation of uniform photonic balls by template-assisted colloidal crystallization," Synthetic Metals, vol. 139, pp. 803-806 (2003).

* cited by examiner

1311

PHOTONIC BALLS CONTAINING A MICROSTRUCTURE OF CORE-SHELL PARTICLES EXHIBITING ANGULARLY-INDEPENDENT STRUCTURAL COLOR

CROSS-REFERENCE TO RELATED APPLICATIONS

This application is a continuation of International Patent Application No. US12/67602, filed Dec. 3, 2012, entitled "Photonic Balls Containing a Microstructure of Core-Shell Particles Exhibiting Angularly-Independent Structural Color," which claims the benefit of the earlier filing date of U.S. Patent Application No. 61/566,301, filed on Dec. 2, 2011 and U.S. Patent Application No. 61/683,006, filed on Aug. 14, 2012, the contents of which are incorporated by reference herein in their entireties.

TECHNICAL FIELD

This technology relates generally to photonic materials. In particular, this technology relates to flexible photonic materials to be used in colorful reflective display.

BACKGROUND

Many species of birds have feathers that are brilliantly colored without the use of pigments. In these cases, light of specific wavelengths is selectively scattered from nanostructures with variations in index of refraction on length-scales of the order of visible light. This phenomenon is called structural color. Structural color is distinct from pigmentary color in that it does not rely on the absorption of light.

Structural color arises from constructive interference of light scattered by variations in the refractive index within a material. A naturally occurring example is opal, whose iridescence is a consequence of Bragg diffraction from its ordered internal arrangement of silica. Similar structural colors can be produced in synthetic systems. For example, artificial opals can be made from self-assembled colloidal crystals in which the particle spacing is on the order of the wavelength of light. In all such materials, the colors vary with the viewing angle because the resonance condition changes as the incident light direction varies with respect to the crystal orientation. This variation of color with angle is well-understood and can be predicted from photonic band theory. Empirical and experimental observation has shown that the color of the preferentially scattered wavelength is on the same order as the average distance between the scattering nanostructures. For nanoparticle arrays, therefore, the particle size determines the array spacing and therefore the color of the observed light.

Less well-understood—and less exploited—are materials in which the structural color does not vary with angle. A recently discovered example from nature is the bright blue plumage of the plum-throated cotinga, whose feathers are patterned with a dense, disordered arrangement of pores. The short-range correlations in the pore network give rise to constructive interference of scattered light. Because the structure is isotropic, the interference condition does not vary with orientation, and therefore the color is independent of the viewing angle. Synthetic materials with similar appearance can be made through a variety of approaches. Amorphous colloidal structures can be made by drying bidisperse mixtures of particles. Thin films of these disordered structures show angle-independent structural color. Similar systems, termed "photonic liquids" or "photonic glasses" can be made from suspensions of highly-charged spheres that, though monodisperse, can nonetheless form amorphous structures due to the soft, long-range electrostatic repulsion between the particles. An alternative approach that does not involve making a disordered system is to dope ordered structures (colloidal crystals) with nanoparticles, which act as scattering sites. The structural color in all of these materials—bird feathers, binary packings, photonic glasses, and nanoparticle-doped crystals—is not due to Bragg reflection, which requires a weakly scattering system with long-range order, but is instead a result of scattering with a strong wavelength dependence that arises from correlations in the colloidal structure.

SUMMARY

A photonic droplet enclosing a microstructure of core-shell colloidal particles which, when subject to ambient light, exhibits angularly-independent structural color is described. The photonic droplet can be used as the colorful elements of pixels in a flexible reflective electronic display.

In one aspect, a photonic assembly for observing, upon incidence of white light, an angle independent range of selected wavelengths, includes an assembly of colloidal particles dispersed in a carrier liquid wherein the colloidal particles include a core scattering center for scattering light and at least one shell layer surrounding the core and the colloidal particles are arranged with short range ordering.

In one or more embodiments, the shell thicknesses of the colloidal particles are selected to provide interparticle core scattering center-to-center distances for additive superimposition of incident light with a range of scattered wavelengths.

In one or more embodiments, the selected range of wavelengths comprises the wavelengths of the red portion of the visible spectrum.

In any of the preceding embodiments, the shell thicknesses of the colloidal particles are selected to provide subtractive superimposition of incident light with a second range of scattered wavelengths.

In one or more embodiments, the second selected range of wavelengths comprises the wavelengths of the blue portion of the visible spectrum.

In any of the preceding embodiments, wherein the sizes of the core scattering centers of the colloidal particles are selected to provide a predetermined opacity and/or to determine the scattering strength of a selected range of wavelengths.

In any of the preceding embodiments, the core scattering centers have diameters in the range of about 80 nm to about 250 nm.

In any of the preceding embodiments, the overall colloidal particle sizes are in the range of about 200 nm to about 1000 nm.

In any of the preceding embodiments, the range of selected wavelengths comprise the red portion of the visible spectrum.

In any of the preceding embodiments, the core scattering centers and shell layers are selected to suppress scattering of the blue portion of the visible spectrum.

In any of the preceding embodiments, the assembly of colloidal particles dispersed in a continuous liquid phase forms a droplet in an emulsion suspension.

In one or more embodiments, the emulsion is a water-in-oil emulsion.

In one or more embodiments, the droplet diameter is about 20 colloidal particle diameters.

In any of the preceding embodiments, the shell layer is index matched with the continuous liquid phase.

In any of the preceding embodiments, the colloidal particles comprise two or more shell layers.

In one or more embodiments, the scattering core centers and inner shell layers are selected to enhance and/or suppress scattering of a selected range of wavelengths and the outer shell layers are selected to be transparent to the incident light and to create constructive and/or destructive interference for a selected range of wavelengths.

In another aspect, a color display includes a plurality of pixels arranged on a surface, each said pixel comprising an arrangement of photonic assembly according to any of the preceding embodiments.

In another aspect, a method of making a photonic assembly for observing, upon incidence of white light, an angle independent range of selected wavelengths, includes coating a core scattering center with a shell layer to make colloidal particles, and packing the colloidal particles in a carrier liquid to induce short range ordering.

In one or more embodiments, the method of making a photonic assembly further includes encasing the packed colloidal particles in an emulsion droplet.

In another aspect, a method of generating an observable color on a surface, includes providing the photonic assembly of one or more embodiments; exposing the surface to white light; and observing color on the surface, wherein the surface exhibits angular-independent structural color.

These and other aspects and embodiments of the disclosure are illustrated and described below.

BRIEF DESCRIPTION OF THE DRAWINGS

The invention is described with reference to the following figures, which are presented for the purpose of illustration only and are not intended to be limiting. In the Drawings.

DETAILED DESCRIPTION

The production of synthetic materials with angle-independent scattering can be achieved by controlling both scattering and correlations. Scattering refers to a change in direction of a light path that takes place when an electromagnetic (EM) wave (e.g., an incident light ray) encounters an obstacle or nonhomogeneity, such as a scattering particle. Correlation refers to positional symmetry of particles in a system. Short-range correlation indicates a system with only short-range positional order and long-range disorder.

In one embodiment of this disclosure, colloidal particles are synthesized with optical properties and packing characteristics designed so that the scattering can be controlled independently of the correlations.

Photonic Droplet 100

Figure 1A:
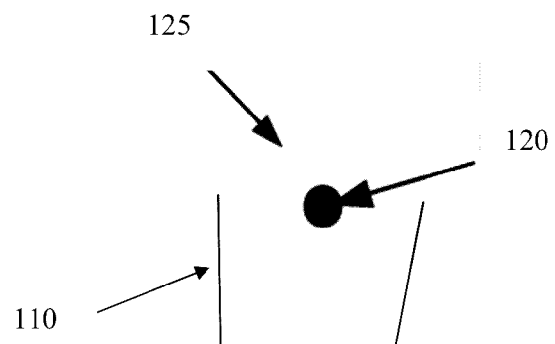
FIG. 1A is a schematic representation of a colloidal particle with a core/shell construction according to one or more embodiments.
Figure 1B:
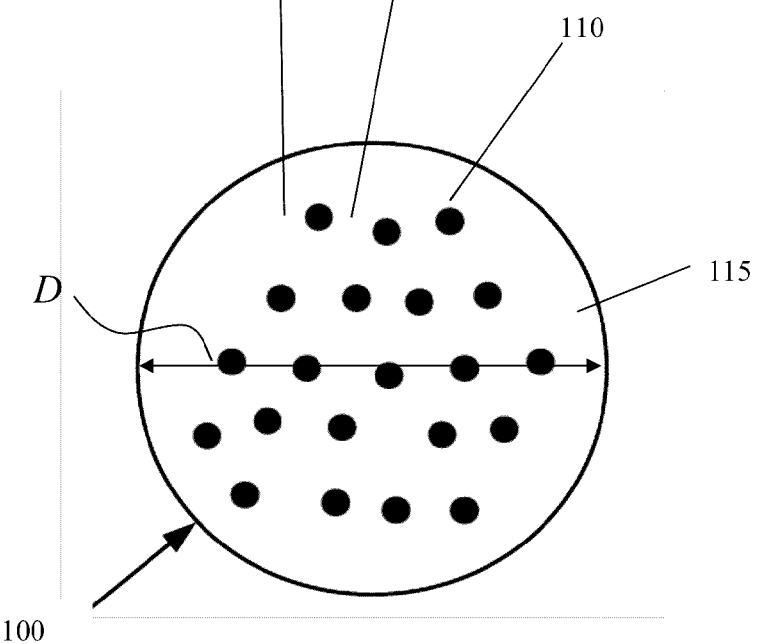
FIG. 1B is a schematic representation of a photonic droplet containing a plurality of colloidal particles in a carrier liquid (e.g., continuous liquid phase) according to one or more embodiments.

FIG. 1B is a schematic illustration of a photonic droplet 100 according to one or more embodiments. As shown, a photonic droplet includes a disordered arrangement of core-shell colloidal particles. The photonic droplets can exhibit angularly-independent structural color when subject to ambient light. The photonic droplets can be used as the colorful elements of pixels in a flexible reflective electronic display.

In one or more embodiments, as shown in FIG. 1B, the photonic droplet 100 contains a plurality of colloidal particles 110 suspended in a carrier liquid (e.g., continuous liquid phase) 115, which also forms the liquid base for the droplet.

As shown in FIG. 1B, a photonic droplet can have a size D that can vary over a range of sizes. In certain embodiments, the photonic droplet can provide sufficient constraining force to at least loosely organize or order the colloidal particles contained therein. In one or more embodiments, the droplet size is in the range of about 1 μm to about 100 μm, or in the range of about 10 μm to about 50 μm, or in the range of about 10 μm to about 25 μm.

It has been observed that larger droplet sizes tend to lighten or "bleach" the color from the photonic particles. However, droplets should also have enough colloidal particles to create a strong wavelength enhancement due to multiple scattering events. Therefore, in some embodiments, the droplet size should be optimized for a selected application. The droplet size can be between 10 and 500 colloidal particle diameters across.

Colloidal Particles 110

As shown in FIG. 1A, colloidal particles 110 have a core 120 and one or more shells 125 made of different materials.

Figure 2:
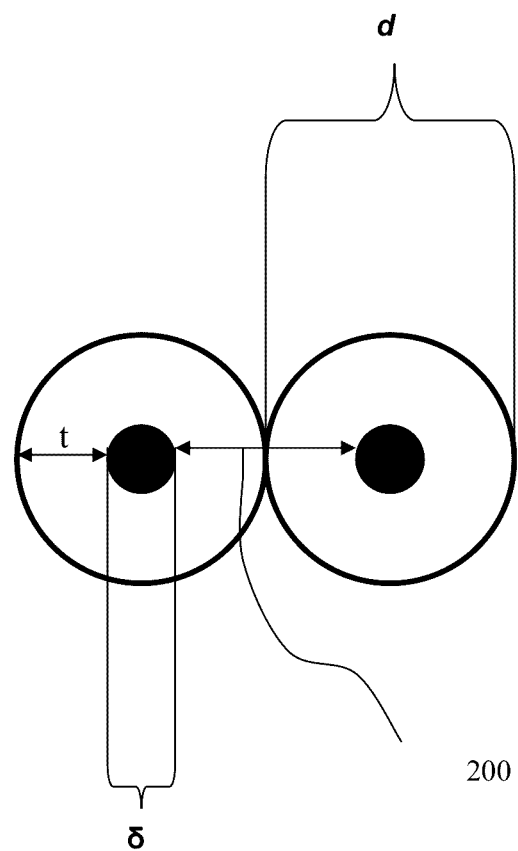
FIG. 2 is a schematic illustration of two colloidal particles indicating how the shell thickness sets the distance between scattering centers according to one or more embodiments.

As illustrated in FIG. 2, the core (e.g., scattering center) 120 has a core diameter of δ; a shell thickness of t; and the core/shell particle 110 has an overall diameter d.

Core 120

In one or more embodiments, the core diameter δ is selected to promote the scattering of the wavelength to be observed. Generally, the core (e.g., scattering center) 120 may have a core diameter δ that is less than the wavelength of the color of light to be observed. In some embodiments, the core scattering center 120 has a diameter δ of about 80 nm to about 250 nm for scattering visible light.

The core particle 120 size can also be selected to control the scattering strength of different wavelengths. For example, the scattering cross-section of a small polystyrene particle in water, e.g. diameter of 100 nm, decreases monotonically with wavelength, scattering blue light wavelengths more strongly than red light wavelengths. However, the scattering cross-section of a large polystyrene particle in water, e.g. diameter of 1 um, has a resonance at 760 nm, scattering more light of that wavelength than of any other wavelength.

The core particles 120 can be made of any suitable materials, such as plastics, inorganic oxides and metals. In certain embodiments, the core particles 120 have materials which scatter wavelengths of interest. In certain embodiments, materials of the core particles 120 do not absorb visible light strongly.

In certain embodiments, the core particles 120 are monodisperse in size. In certain embodiments, the core particles 120 are polydisperse in size, where the standard deviation in particle size is on the order of 10-20%.

In certain embodiments, the core particles may be spherical, oblong, ellipsoidal, polyhedral, or dumbbell-shaped. In certain embodiments, the core-particles may also surface features such as dimples.

Some exemplary plastics or polymers that can be utilized for core particles include polystyrene and its derivatives, poly-methacrylate and its derivatives (such as poly-methylmethacrylate), and polydimethylsilsesquioxane.

Some exemplary inorganic oxides that can be utilized for core particles include silicon dioxide, titanium dioxide, zinc oxide and zirconium dioxide.

Some exemplary metals that can be utilized for core particles include aluminum, titanium and chromium.

In certain embodiments, the refractive index of the core 120 can range from about 1.3 to about 2.5. For example, the refractive index of the core 120 may be 1.6.

Shell 125

In the photonic droplet 100, the core/shell particles can take on a close, but disordered packing so that particles line up edge to edge, as shown in FIG. 1B and FIG. 2. The shell 125 can act as a spacer so that the cores 120 are separated by a distance 200 that approximates two times the shell thickness (ca. 2t). As used herein, the distance between cores 120 is referred to as the 'interparticle distance'. The interparticle distance defines the Bragg (scattering) condition that sets the wavelength of reflected (observed) light. Thus, the cores 120 serve as Bragg scattering points spaced apart in the photonic droplet 100 by a length defined by the shell thickness t.

Thus, the shell 125 is selected to have a thickness t that provides overall colloidal particle 100 dimensions that are comparable to optical wavelengths of the color to be observed. For example, the shell thickness t is selected to provide a colloidal particle size (2t+δ) in the range of about 200 nm to about 1000 nm.

In order to promote scattering, the refractive index of the core 120 may be different than the refractive index of the shell 125. The core may have a higher or a lower index of refraction than the shell. In certain embodiments, the cores/shell particles have a large, low refractive index shell and a small, high refractive index core. For example, the refractive index of the core can be 1 (empty core) and the refractive index of the shell can be 1.5, or the refractive index of the core can be 2.3 and the refractive index of the shell can be 1.6.

In certain embodiments, the shell material 125 has the same or similar index of refraction (index match) as the carrier liquid 115. For instance, if the medium is water the shell can be made of poly(N-isopropylacrylamide-co-acrylic-acid).

Exemplary materials for use as the particle shell 125 include materials that are index matched with the dispersion liquid (e.g., carrier liquid) 115, such as poly(N-isopropylacrylamide-co-AAc), poly-methyl-methacrylate, or silica.

Shells 125 can include materials which do not absorb visible light strongly, and which have colloidal stability.

Figure 7:
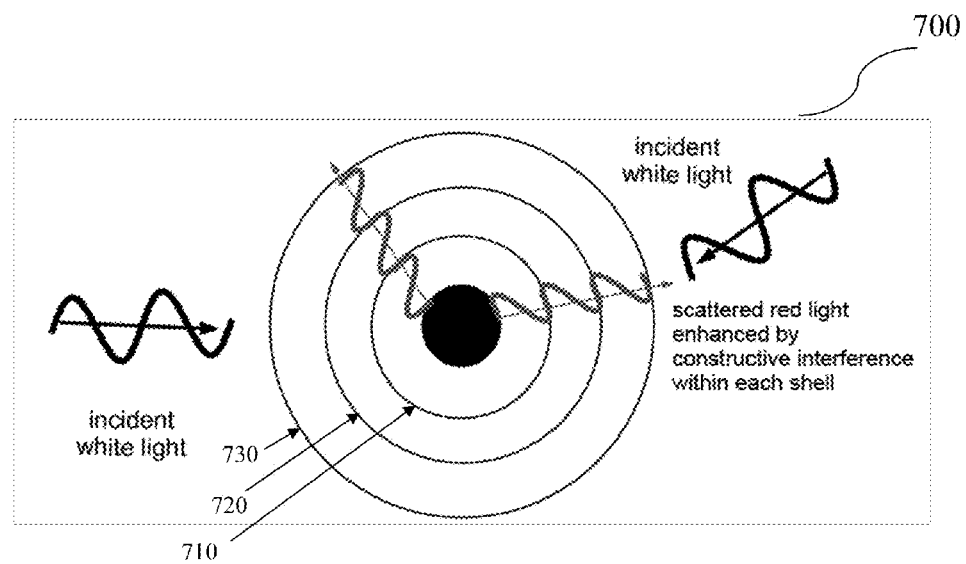
FIG. 7 is a schematic illustration of a multishell colloidal particle that promotes red scattering in the assembled particles according to one or more embodiments.

Colloidal particles may also have multiple shell layers as shown in FIG. 7 (layers 710, 720, 730 . . . ) and detailed below.

The shell layer 125 can be formed on the core using various techniques, such as seeded emulsion polymerization and multilayer deposition. In certain embodiments, the shell can be grown on the core by using emulsion polymerization of suitable monomers in the presence of the core nanoparticles. For example, core-shell particles comprising micrometer size poly(N-isopropylacrylamide-co-acrylic acid) (PNIPAM-co-AAc) in the shell and small polystyrene in the core were prepared using emulsion polymerization. By optimizing the synthesis conditions for the shell and adding acrylic acid (AAc) to the monomer mixture, it is possible to create micrometer- and submicrometer-scale aqueous particles in high yield with variable scattering cross sections controlled entirely by the small cores. For further detail, see, Perro et al. *Langmuir* 2009, 25(19), 11295-11298, the contents of which is incorporated herein in its entirety by reference.

Carrier Liquid 115

The carrier liquid (e.g., continuous liquid phase) 115 for the colloidal particles can be any carrier liquid.

In one or more embodiments, the carrier liquid is non-reactive with the components of the colloidal particle.

In one or more embodiments, the carrier liquid is index-matched with the shell of the colloidal particle, that is, the index of refraction of the carrier liquid and the shell are the same or substantially the same so that there is no scatter of light at the carrier liquid/shell interface.

Exemplary carrier liquids include water, or mixtures of water with solvent to adjust the refractive index of the carrier liquid, such as ethanol, ethylene glycol, glycerol, formamide and dimethyl-sulfoxide.

Ordering of Particles 110

The droplet 100 shape and size provide some order to the particles in the particle suspension; however, due to the manufacturing method, which involves condensing the suspension of colloidal particles 110 faster than the time it takes for the particles to have time to crystallize, the particles are jammed—not highly ordered or rigidly arranged. In one or more embodiments, the colloidal particles 110 form a disordered array. The colloidal particles 110 in the disordered array form contacting (or near-contacting) relationships with neighboring particles so that the cores 120 are spaced apart from each other by a length on the order of the particle diameter. The absence of complete order may provide angular independence to the observed structural color. The angular independence may be observed from a 60° incidence angle, 90° incidence angle, or a 180° incidence angle.

Short range order is defined as positional correlation of particles with their first or first, second, third, of even fifth neighbors without long range ordering, such as that found in a crystalline lattice. Long range positional order is defined as positional correlation of particles with their tenth and even more distant neighbors. In certain embodiments, it is preferable to have positional order with only the first or first and second neighbors and to not have the lattice be perfectly periodic.

Design Parameters

These particles are assembled in a structure which, when illuminated, reflects a narrow range of visible wavelengths in a wide range of directions. Without wishing to be bound by theory, the underlying physical mechanism can rely on constructive interference between light waves that scatter from the refractive index variations in the microstructure within the ball; this phenomenon is generally known as structural color. The core-shell nature of the colloidal particles allows tuning of the optical properties via independent control of several parameters: the size of the particle cores, the thickness of their shells, the refractive indices of the cores and shells, and the polydispersity of the ensemble of particles.

The selection of larger core scattering center 120 diameters would lead to an increased opacity of the resulting color (e.g., a decreased amplitude of scattered wavelengths).

The spacing (inter-particle distance 200) between core scattering centers (determined by shell layer 125 thickness) determines the range of wavelengths which will be scattered. As explained in more detail below, the spacing between the core centers can be selected to be an integer or a half integer multiple of certain wavelengths in order to resonantly enhance or suppress this range of wavelengths via constructive or destructive interference. Interference is a phenomenon in which two waves superimpose to form a resultant wave of greater (constructive interference) or lower (destructive interference) amplitude.

Refracting index contrast between the core 120 and shell layer 125 result in increased particle scattering and an increased opacity of the resulting color.

These parameters allow the selection of the wavelength that is reflected and thus of the resulting color (or range of wavelengths). The photonic droplets 100 according to one or more embodiments successfully decouple the particle size d of the colloidal particle, and hence the inter-particle distance 200, from the particle size of the core scattering center δ.

The lack of high positional ordering makes this system more tolerant to polydispersity of shell layer 125 thicknesses or core scattering center 120 diameters. A range of shell layer thicknesses would result in a more washed out wavelength/color response (e.g., a wider range of wavelengths). A range of core center sizes would lead to an intermediate opacity of the wavelength response (e.g., an opacity resulting from an average core diameter).

The colloidal particle cores 120 and shells 125 may be uniformly rescaled to scatter in the visible, UV, or IR wavelength ranges.

Enhanced Scattering for Colloidal Particles with Shell Layers 125 Index Matched to Surrounding Medium 115

It has been observed that materials commonly used for preparation of core/shell particles, such as polystyrene, scatter more strongly in the blue than in the red region of the visible spectrum. The refractive index of materials varies with the wavelength of light. This is called dispersion and causes prisms to divide white light into its constituent spectral colors. In a prism, dispersion causes different colors to refract at different angles, splitting white light into a rainbow of colors. As the refractive index varies with wavelength, so will the refraction angle as light goes from one material to another. In regions of the spectrum where the material does not absorb, the refractive index tends to decrease with increasing wavelength for visible light. Thus, the refractive index contrast between the solvent medium and materials commonly used as scattering centers (such as polystyrene) decreases with increasing wavelength. Thus, longer wavelengths, such as in the red region of the visible spectrum, interact with scattering centers more weakly than blue. Thus, structural color devices in the past have typically lacked red color.

As detailed below, the unique abilities of the photonic droplets 100 according to one or more embodiments to decouple the size of the scattering center δ from the Bragg scattering wavelength permits the fine tuning of the structural color to enhance reflection spectra in the red.

In one or more embodiments, the liquid suspension medium (e.g., carrier liquid) 115 of the photonic droplet (which is index matched to the shell layer 125) is selected to enhance the reflection spectra in the red (or other wavelengths of interest in the UV, visible or IR). In one or more embodiments, the colloidal particles are suspended in a medium with an appropriately tuned dispersion, for example for enhanced red scattering. The interaction of light with scattering centers in a medium depends on the ratio of the refractive index of the material they are made of to the average refractive index of the surrounding medium. If the material of the particles has a refractive index which decreases with increasing wavelength, but the particles are immersed in a medium with a refractive index which decreases even more with increasing wavelength, then the resulting ratio of refractive indices will increase with increasing wavelength. In this situation the particles in the medium will interact more strongly with red light than with blue light. The wavelength dependence of the refractive index of the surrounding medium 115 can be changed by mixing it with other solvents with different refractive indices. For example, if the scattering cores 120 are polystyrene, suitable materials for the medium may be mixtures containing ethylene glycol.

Figure 3:
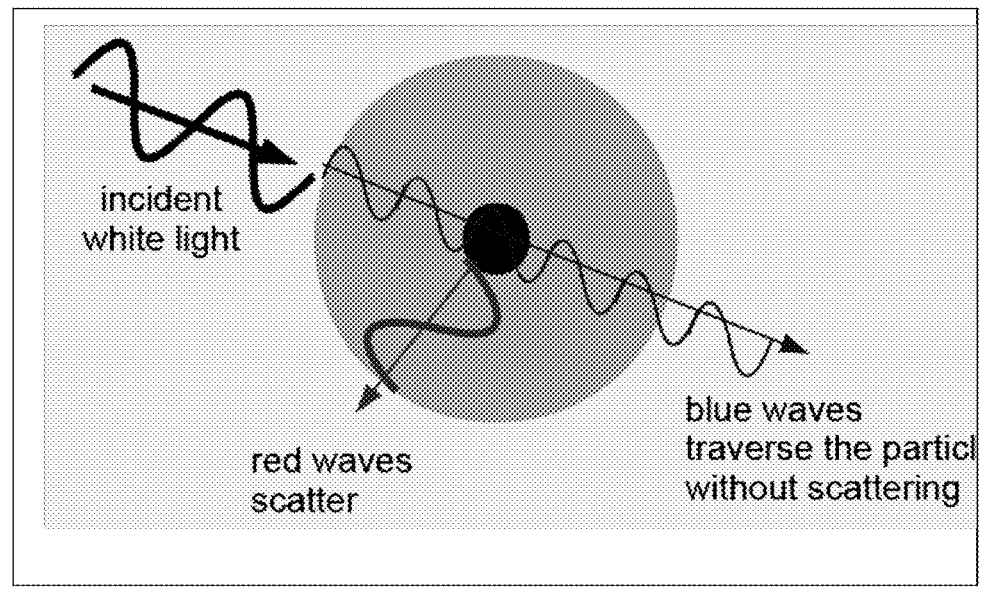
FIG. 3 is a schematic illustration of light interaction with a colloidal particle in which the composition of the colloidal particle is tuned to scatter light having red wavelength according to one or more embodiments.

In one or more embodiments, the colloidal particles 110 of the photonic droplet 100 are selected to enhance the reflection spectra in the red. By way of example, the core 120 can be prepared from a highly dispersive material, that is, a material where the refractive index varies significantly with wavelength. The core can be made from a material that is index-matched to its surroundings (shell 125 and liquid medium 115) for one color, but not for another color. Thus, in order to enhance red reflection spectra, the core is selected to be invisible to blue light, but to scatter red. FIG. 3 illustrates this phenomenon. FIG. 3 illustrates a colloidal particle having a shell 125 and core 120 selected to selectively scatter red light. The particle shell 125 is selected to be index-matched with the surrounding medium 115 so that the light enters the particle with out diffraction. Incident light can be broad spectrum, e.g., white, light. Light traveling through the particle interacts with the core scattering center. The scattering center 120 is made from a material that is invisible to blue light, so that blue light passes through the core without scattering. In contrast, the material of the core 120 is sensitive (dispersive) to red light, so that red light scatters and is reflected back in a broad viewing angle from the scattering center.

The dispersive properties of materials are generally known and selection of suitable materials can be made by reference to treatises and methods that report and measure dispersive properties of materials. Relevant resources on the dispersive properties of materials include databases such as http://refractiveindex.info; *Handbook of Optics*, McGraw-Hill 1994; and publications such as Nina G. Sultanova, Stefka N. Kasarova, Christo D. Ivanov and Ivan D. Nikolov, "Refractive data of optical plastics for laser applications", Proc. SPIE 6252, 62520H (2006); S. N. Kasarova et al. *Analysis of the dispersion of optical plastic materials*, Optical Materials 29, 1481-1490 (2007); Hassan El-Kashef. *The necessary requirements imposed on polar dielectric laser dye solvents*, Physica B: Condensed Matter 279, 295-301 (2000), the contents of which are incorporated by reference herein in their entireties.

Enhanced Resonance and Scattering for Colloidal Particles with Shell Layers 125 with Index Contrast to Surrounding Medium 115

In another embodiment, the shell 125 thickness in the shell/core particle is selected to resonantly enhance the scattering of a particular wavelength and/or destructively cancel the scattering of a different wavelength. (This is equivalent to changing core center spacing).

Resonance is the tendency of a system to oscillate at a greater amplitude at some frequencies than at others. Increasing the amplitude of the certain frequencies, increases the strength of the corresponding observed color in structurally colorful materials.

The mechanism of enhanced scattering via index contrast (as above) may also be used for these colloidal particles by selecting a core 120 and shell 125 materials with appropriate dispersive properties and index contrasts.

Figure 4:
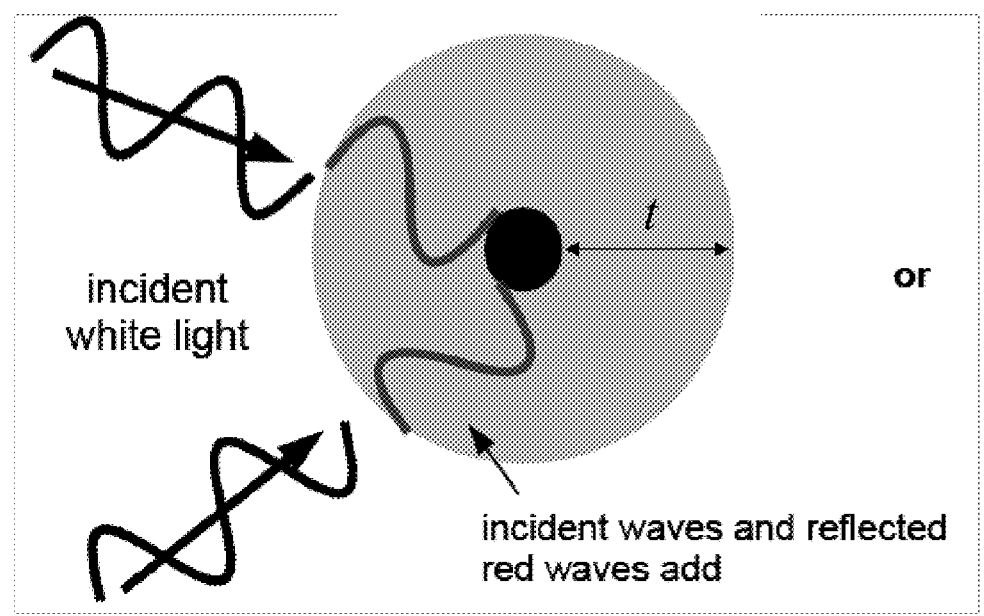
FIG. 4 is schematic illustration of a colloidal particle having a core/shell construction that enhances scattered red light according to one or more embodiments.

In another embodiment, the shell 125 thickness in the shell/core particle is selected to either resonantly enhance red scattering or destructively cancel blue scattering (or other wavelengths of interest in the UV, visible or IR). Both objectives can have the result of increasing red structural color of a particle. As shown in FIG. 4, a core/shell arrangement of a colloidal particle in a photonic droplet is selected to have a shell thickness t that enhances red scattering. The shell thickness is approximately an integer multiple of a red wavelength of interest. Because the thickness of the shell is a multiple of red light, the incident red wavelengths of light and the scattered red light are additive (e.g., they constructively interfere) and the intensity of the reflected red light is increased. This effect can also be coupled with enhanced scattering via index contrasts so that when incident white light interacts with the colloidal particle core, as shown in FIG. 4, red light is scattered from the scattering center more strongly than blue light, contributing to a larger enhancement than with resonance alone.

Figure 5:
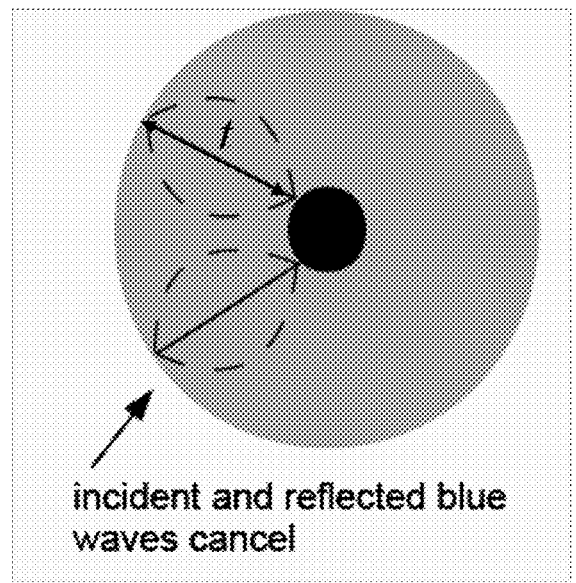
FIG. 5 is schematic illustration of a colloidal particle having a core/shell construction that suppresses scattered blue light according to one or more embodiments.

In alternative embodiments as shown in FIG. 5, a core/shell arrangement of a colloidal particle 110 in a photonic droplet 100 is selected to have a shell thickness t that suppresses blue scattering. The shell thickness is approximately one-half integer number of a blue wavelength of interest. When incident white light interacts with the colloidal particle core, as shown in FIG. 5, blue light is scattered from the scattering center. Because the thickness of the shell is about ½ multiple of blue light, the incident light and the scattered blue light cancel one another (e.g., they destructively interfere) and the intensity of the scattered blue light is decreased. Use of shell thickness can be used in conjunction with other measures described herein to enhance red structural color. For example, both the shell thickness and the colloidal material and liquid medium composition can be cooperatively selected to enhance red structural color according to one or more embodiments described herein.

Colloidal Particles 110 with Multiple Shell Layers 125

In one or more embodiments, the particles 110 of the photonic droplet 100 include two or more shells about a scattering core. The shells 125 are made of different materials and are selected to provide multiple functionalities to the colloidal particle. For example, the shell layers can be selected to have different dispersive properties, different refractive indices and/or different thicknesses.

Figure 6:
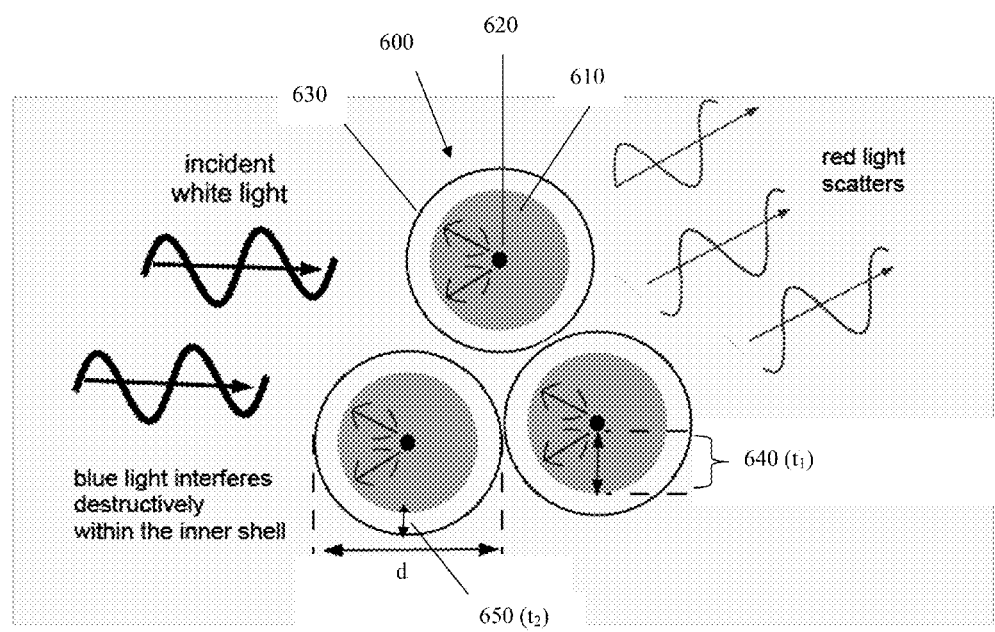
FIG. 6 is a schematic illustration of a two-shell colloidal particle that both suppresses blue scattering and sets interparticle distances to promote red scattering in the assembled particles according to one or more embodiments.

FIG. 6 is a schematic illustration of a two shell colloidal particle 600 that both suppresses blue scattering (e.g., via index contrast scattering enhancement) and has interparticle distances to promote red reflection (e.g., via enhanced resonance) in the assembled particles. In one embodiment, a first shell layer 610 is selected to have a shell thickness $t_1$ (640) that suppresses blue scattering. As noted above, shell thicknesses having an integer multiple of the half-wavelength of blue light could destructively interfere with and cancel blue light scattered by scattering core 620. The first shell can be an inner shell closest to the scattering core. The second shell layer 630 can be transparent to incident light and is of a thickness $t_2$ (650) that provides an overall particle dimension d that is about an integer multiple of the wavelength of red light. When the distance between cores ($2t_1$) is a multiple of the wavelength of red light, the interparticle separation permits resonant Bragg-type scattering in the red. Other methods of promoting destructive interference can also be employed.

FIG. 7 is a schematic illustration of a multishell colloidal particle 700 that enhances red reflection according to one or more embodiments. Colloidal particle 700 has multiple shells 710, 720, 730 . . . , each tuned to resonantly enhance red wavelengths as they bounce between the shell walls. Multiple layers can be used to increase the quality factor of the resonance wavelength. The quality factor or Q factor is a dimensionless parameter that characterizes a resonator's bandwidth relative to its center frequency. Higher Q systems will have narrower bandwidth of higher intensity. The scattered red light is enhanced by constructive interference within each shell. As illustrated in FIG. 7, the scattered red light waves are additive for each layer 710, 720, 730 . . . , and the intensity of the scattered red light is increased. Each shell thickness is approximately an integer multiple of a red wavelength of interest. Because the high Q-resonances are achieved using multiple layers, each having an integer multiple of red light, the colloidal particles can be large and the interparticle distance also becomes large. Bragg-type scattering can become inefficient. In one or more embodiments, a percentage of the population of colloidal particles is multilayer high-Q particles. By interspersing a few number % of such large particles within the photonic droplets, the overall red color response can be enhanced. By way of example, the photonic droplets can include about 0.1-20% by number, or about 1 to 5% by number of high-Q particles.

Droplet Generation

The photonic droplet 100 consists of two separate phases: a dispersed phase made up of core/shell particles 110 and a continuous phase in which the colloid particles are microscopically evenly dispersed. The core/shell particles are small and typically have dimensions of less than 1 micron.

In one or more embodiments, the photonic droplets 100 are suspending in a second continuous phase to form, for example, a water-in-oil emulsion or an oil-in-water emulsion. Other methods for generating droplets are also contemplated. In one or more embodiments, the droplet is a water-based microdroplet in oil. Uniform assemblies of the colloidal particles can be produced by injecting an aqueous suspension of the core/shell particles into a surfactant-laden oil phase. The size of the droplets 100 is controlled using conventional techniques (for example, by microfluidic droplet generation). In this case, emulsion droplets provided the geometrical confinement for the self assembly of colloidal particles. Specifically, colloidal particles in confining droplets were self-organized into amorphous colloidal assemblies as the droplets formed.

Applications

The emulsion formulation is well suited for incorporation into electronic inks and for use in electronic displays. In one or more embodiments, the emulsion contains photonic droplets 100 having a size in the range of about 1 μm to about 100 μm, or in the range of about 10 μm to about 50 μm, or in the range of about 10 μm to about 25 μm. In particular embodiments, emulsion inks having uniform emulsion droplets of about 10 μm are used. The design and manufacturing of colorful and flexible reflective displays is an area of active research. Current commercially available reflective displays, like the ones developed by E-Ink, are restricted to black and white colors. Displays incorporating the photonic droplet according to one or more embodiments are colorful. Contrary to other colorful reflective displays under development, the photonic droplets do not rely on the use of any filtering materials for color selectivity and can therefore lead to displays with very high efficiency. Other potential uses for this invention include cosmetics, paints and coatings.

The following non-limiting examples further illustrate certain embodiments. Materials that display angle-independent structural color can be achieved by controlling both scattering and short-range correlations in the refractive index. A way to make such materials in certain embodiments is demonstrated in the following non-limiting examples by packing core-shell colloidal particles consisting of high-refractive-index cores and soft, transparent shells. The core-shell structure allows for control of the scattering cross section of the particles independently of the interparticle distance 200, which sets the resonance condition. At the same time, the softness of the shells allows for assembly of disordered structures through centrifugation. Packings of these particles display angle-independent structural colors that can be tuned by changing the shell diameter, either by using different particles or simply by varying the concentration of the suspension. The transparency of the suspensions can be tuned independently of the color by changing the core diameter. These materials may find applications in electronic displays, cosmetics, or long-lasting dyes.

METHODS FOR EXAMPLES 1-3

Synthesis and Characterization of Core-Shell Particles

The particles consist of a polystyrene core 120 ($n_{PS}$=1.6) and a poly(N-isopropylacrylamide-co-acrylic-acid) shell 125 with refractive index matched to that of the surrounding water ($n_{water}$=1.34 at 500 nm). The particles were prepared by a two-stage emulsion polymerization process that allows independent control of the core and shell sizes. All materials were used as received.

In a typical procedure for the core 120 synthesis, 0.38 g of sodium dodecyl sulfate (SDS, 99%, J. T. Baker) and 3.75 g of N-isopropylacrylamide (NIPAM, 97%, Aldrich) were dissolved in 262.5 mL of Milli-Q-grade deionized water (Millipore, 18.2 MΩ-cm) in a 500 mL three-necked round-bottom flask equipped with a reflux condenser, a nitrogen inlet and a mechanical stirrer. Then 71.25 mL of styrene (99%, Alfa Aesar) were added under vigorous stirring. After the mixture was heated to 80° C., 180 mg of potassium persulfate (KPS, 99%, Acros) dissolved in 7.5 mL of deionized water were added. The reaction ran for 8 hours. The resulting polystyrene particles were dialyzed against deionized water for five days; the water was changed every two hours on the first day of dialysis and every twelve hours during the subsequent four days. The core particle diameter δ was controlled by varying the amount of SDS, which sets the initial number of nuclei.

To cover the polystyrene particles with shells 125, 5.73 g of NIPAM, 0.03 g of N,N'-methylenebisacrylamide (MBA, molecular biology grade, Promega), 0.23 mL of acrylic acid (AAc, 99%, Sigma), and 30 mL of polystyrene latex at 20% w/w were first mixed in a reaction vessel identical to that used in the core synthesis. The mixture was heated under stirring to 80° C., and 0.222 g of KPS dissolved in 5 mL of deionized water were then added to start the reaction. The reaction ran for 3 hours. The thickness of the resulting poly(NIPAM-co-AAc) shells 125 was controlled by varying the volume ratio of the monomer solution to the polystyrene seed particles.

The resulting core-shell particles 110 were dialyzed against deionized water for two days; the water was changed every two hours during the first day and every twelve hours during the second day.

It can be appreciated that since the poly(NIPAM-co-AAc) shells respond to changes in temperature and pH, they can be the precursor to materials with switchable optical properties.

The hydrodynamic diameter of the synthesized particles was measured with a dynamic light scattering apparatus (ALV SP-125) and a 532 nm Verdi laser (Coherent).

Assembly of Disordered Packings

Amorphous packings were made by centrifuging aqueous suspensions of core-shell particles 110 at 14000 g for two hours and removing supernatant until the final sample was concentrated by a factor of 3. The suspension was then remixed by hand. The final volume fraction was high enough for the particles to pack into an amorphous structure. The packings were so dense that, when viewed under the microscope, there was no observable Brownian motion.

Depletion interactions were also used to make dense packings. As depletant polyacrylamide (molecular weight 5,000,000-6,000,000, 100%, Polysciences) was used. In a typical experiment, 1 mL of aqueous polyacrylamide solution at 1% w/w was added to 1 mL of core-shell suspension at 0.5% w/w. The particles aggregated for one week.

Characterization of Packings

The structure of the concentrated core-shell suspensions was probed with confocal microscopy. Samples were prepared by confining 1-2 μL of suspension between a glass slide and a glass coverslip and sealing the chamber with optical-grade, low-viscosity, UV-curable epoxy (Norland Optical Adhesive 61, Norland Products, Inc.). Samples were imaged in reflection mode with a Leica TCS SP5 resonant confocal microscope using 63× and 100× NA=1.4 oil immersion objectives and an Argon laser at 458 nm and 476 nm.

Figure 8:
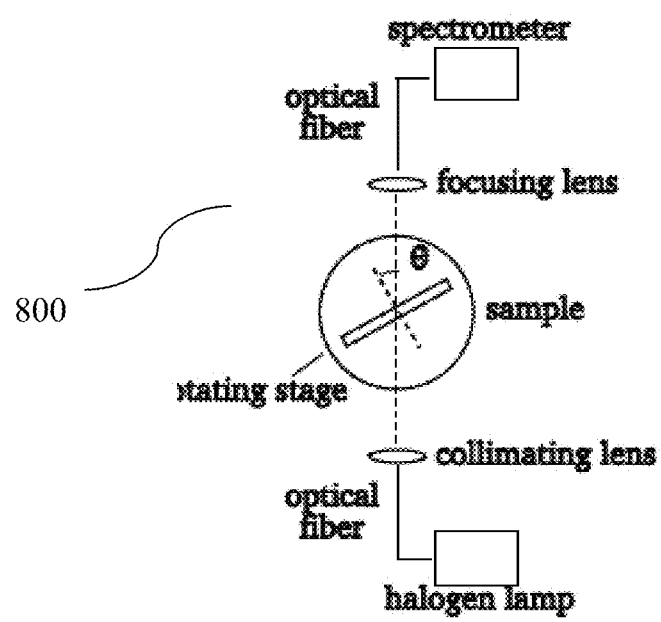
FIG. 8 is a schematic of the apparatus for spectral transmission measurements. Only one of the two rotation stages is shown, according to one or more embodiments.

The colors of the samples were quantified by measuring their optical transmission spectra over a range of angles from 0 to 30 degrees, measured with respect to the normal. FIG. 8 shows a schematic of the apparatus for spectral transmission measurements 800. Samples for spectroscopy were prepared in the same way as for confocal microscopy. Transmission spectra were measured using an Ocean Optics HR2000+ spectrometer. The incident light came from a halogen DH-2000 illumination lamp coupled into an optical fiber and collimated by a lens. The direction of the illumination beam was fixed with respect to the optical table, and the detector was positioned to face the beam. Light transmitted through the sample was focused by a lens onto another fiber, which was connected to the spectrometer. The setup was mounted on a two-axis goniometer allowing independent rotation of the sample and detector around a common axis (only one of the two rotation stages is shown in FIG. 8). To account for the variation of illuminated area with angle, the transmitted spectrum was normalized to the spectrum transmitted at the same angle through a glass chamber filled with deionized water.

The resonant wavelength of each sample was determined from the transmission spectrum after correcting for non-resonant scattering. In the absence of correlations, the Beer-Lambert Law shows that the transmission should scale as $$-\ln T/\sigma_s = \rho l \quad (1)$$

where T is the transmission (ranging from 0 to 1), $\sigma_s$ is the single-particle scattering cross-section, $\rho$ is the number density of scatterers, and l is the sample thickness. We divided the negative logarithm of the measured transmission at each wavelength by the scattering cross-section section of the particle core, which we calculated using Mie theory. Correlations introduce deviations from Equation 1 that result in clear peaks in the corrected spectra. We identified the resonances by locating the wavelengths corresponding to the maxima of the peaks.

Example 1

Figure 9A:
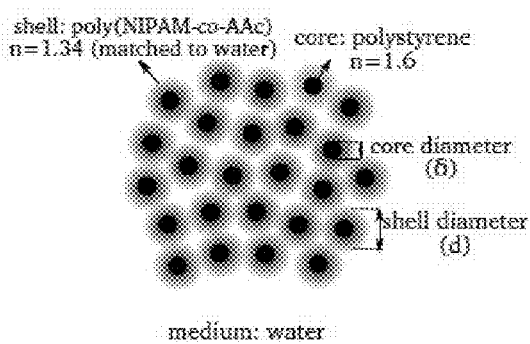
FIG. 9A is a schematic of the system showing all components and refractive indices at 500 nm (PS: polystyrene, poly(NIPAM-co-AAc): poly(N-isopropylacrylamide-co-acrylic acid), water), according to one or more embodiments
Figure 9B:
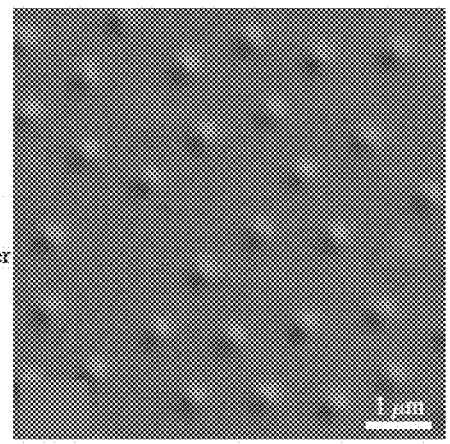
FIG. 9B is a differential interference contrast micrograph of an amorphous aggregate of core-shell particles, according to one or more embodiments. The hydrodynamic diameter of the cores is 230 nm and that of the shells is 2100 nm (here the shells are compressed).
Figure 10A:
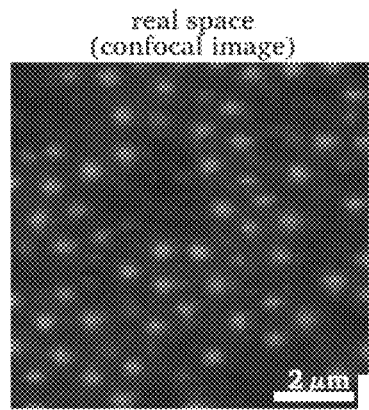
FIGS. 10A and 10B are confocal microscope images (left column) and azimuthally-averaged, 2D spatial power spectra of the images (right column) for amorphous, dense suspensions of core-shell particles with hydrodynamic core and shell diameters $(\delta, d)=(230$ nm, 2500 nm) (A) and diameter $(\delta, d)=(180$ nm, 940 nm) (B), according to one or more embodiments. The inset on the right in A is the average of the power spectra of a z-stack of confocal images with depth 19 μm. The inset on the right in B is the power spectrum of the image on the left. The peaks in frequency space correspond to a characteristic length scale of 897 nm in A and 322 nm in B. In both insets the values around zero spatial frequency are masked and a threshold to the dynamic range is set for better contrast. The bars correspond to 10 $\mu m^{-1}$.
Figure 10A:
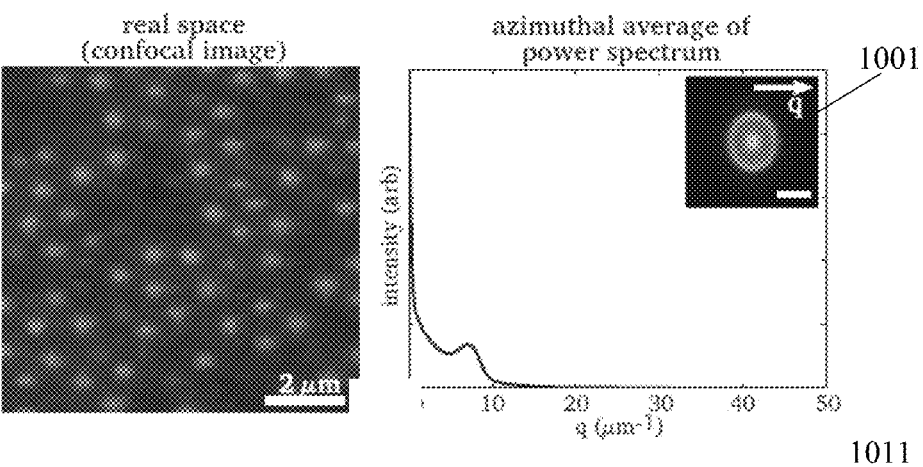
Figure 10B:
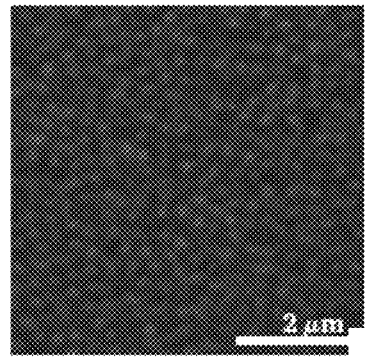
Figure 10B:
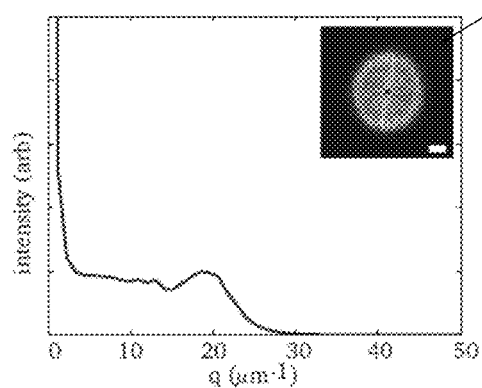

Colloidal particles 110 are synthesized with optical properties and packing characteristics designed so that the scattering can be controlled independently of the correlations. The particles consist of a hard, polystyrene core 120 and a soft, poly(N-isopropylacrylamide-co-acrylic-acid) (poly(NIPAM-co-AAc)) shell 125 (as shown in FIG. 9A). FIG. 9B shows a differential interference contrast micrograph of an amorphous aggregate of core-shell particles. The hydrodynamic diameter of the cores 120 is 230 nm and that of the shells is 2100 nm (here the shells are compressed). The shells 125 of the particles are transparent because they are index-matched to the solvent. The scattering is therefore dominated by the core and is decoupled from the particle size. In dense samples, the scattering cross-section and form factor can be varied independently of the interparticle distance and structure factor. This is not possible in materials made from packed solid particles. The decoupling allows the wavelength of the structural color to be controlled independently of the transparency and saturation.

At the same time, the softness of the shells facilitates the assembly of disordered structures that show angle-independent structural color. Glassy structures can be made simply by concentrating the soft particles. The principal advantage of a soft steric interaction over a soft, long-range electrostatic interaction is that it obviates the need for long electrostatic screening lengths, which can be difficult to create and maintain in a colloidal suspension.

Structure of Core-Shell Packings

Centrifuged core-shell particle 110 suspensions are amorphous and packed, as can be seen in the microscope images shown in FIG. 10. Confocal microscope images (FIG. 10A, B left column) and azimuthally-averaged, 2D spatial power spectra of the images (FIG. 10A, B right column) for an amorphous, dense suspensions of core-shell particles with hydrodynamic core 120 and shell 125 diameters (δ, d)=(230 nm, 2500 nm) in FIG. 10A and (δ, d)=(180 nm, 940 nm) are shown in FIG. 10B. The 2D power spectra 1001, 1011 obtained from the spatial Fourier transforms of these images have a bright circular ring centered at zero wavevector, showing that the structures are isotropic. A peak in the power spectrum indicates a characteristic structural length scale $\alpha=2\pi/q_{peak}$, where $a_{peak}$ is the magnitude of the wavevector. In both samples the length scale $\alpha$ agrees with the interparticle distance 200 from the real-space images. This length is slightly smaller than the measured hydrodynamic diameter of the core-shell particles because the poly(NIPAM-co-AAc) shells are deformable. It is difficult to measure interscatterer spacings much smaller than 310 nm because samples with these spacings did not yield clear real-space images for any layers besides the one closest to the coverslip, likely because such spacings are close to the diffraction limit.

Optical Properties

Figures 11A, 11B, 11C:
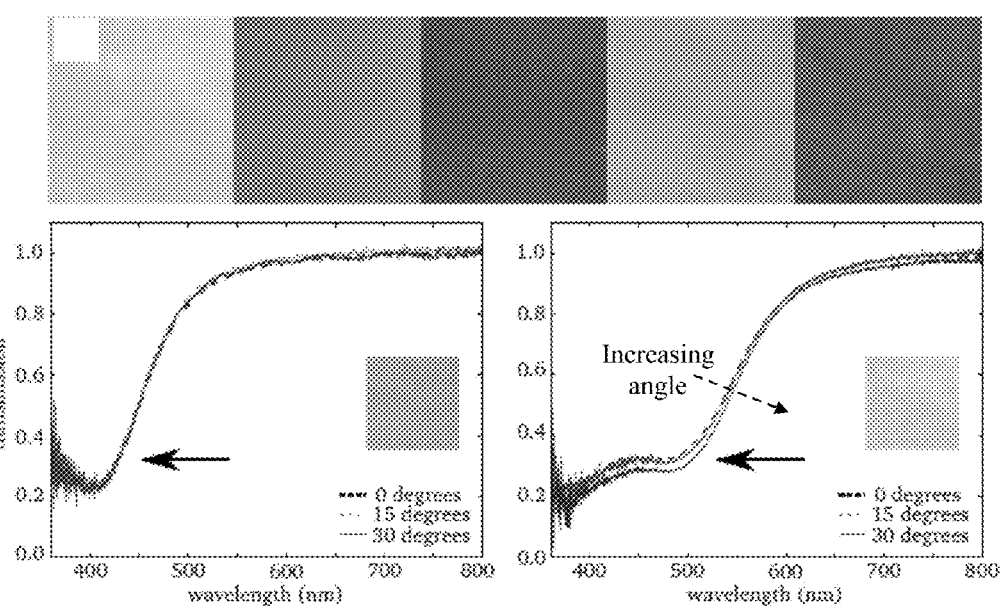
FIG. 11A shows photographs of amorphous packings made from particles with various core and shell diameters, showing the range of appearances that can be produced, according to one or more embodiments. The field of view for each sample is 2 mm×2 mm.
FIGS. 11B and 11C show transmission spectra of two amorphous packings of core-shell particles with different shell diameters, at various angles, according to one or more embodiments. The hydrodynamic diameter of the shells is 430 nm in B and 640 nm in C, and the diameter of the cores is 180 nm in both cases. The angles are measured between the axis of illumination-detection and the normal to the sample surface. Insets show photographs of samples with a 1 mm×1 mm field of view.

The samples display colors that can be observed by eye (as shown in FIG. 11A) and quantified by transmission spectra. The colors can be varied by changing the shell 125 diameter, which controls the interparticle spacing 200. FIG. 11B and FIG. 11C show photographs and transmission spectra as a function of angle for two dense packings of particles with the same cores but different shell diameters. The hydrodynamic diameter of the shells is 430 nm in FIG. 11B and 640 nm in FIG. 11C, and the diameter of the cores is 180 nm in both cases. Both were prepared using centrifugation. Because these samples have resonant wavelengths in the visible regime, the inter-particle spacing is too small to resolve with optical microscopy. However, the locations of the resonances—at 417 nm for the sample made of particles with shell diameter 430 nm (FIG. 11B) and at 498 nm for a shell diameter of 640 nm (FIG. 11C)—correlate with the particle sizes as indicated by arrows in FIGS. 11B and 11C. Moreover, the colors are independent of the angle of illumination, indicating that the underlying structures are rotationally symmetric.

Figure 12A:
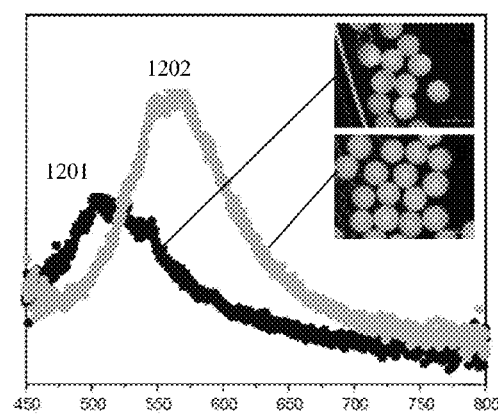
FIGS. 12A and B are a set of photographs and corresponding reflection spectra as a function of wavelength (in nm) for dense packings of particles within photonic balls with the same cores but different shell diameters, according to one or more embodiments.
Figure 12B:
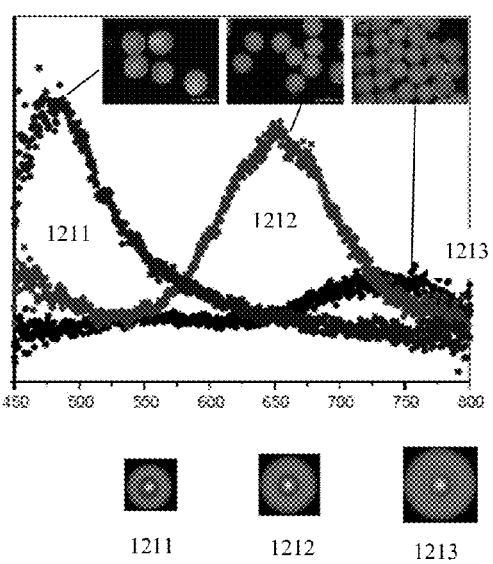

FIG. 12A and FIG. 12B show a different set of photographs and reflection spectra as a function of wavelength (in nm) for dense packings of particles within photonic balls 100 with the same cores 120 (diameter of 170 nm) but different shell 125 diameters. The photonic balls were synthesized via the method detailed in Example 4 below. These again demonstrate that the colors can be varied by changing the shell diameter, which controls the inter-scatterer spacing 200. FIG. 12A shows reflection spectra and corresponding photographs of photonic balls for two different samples 1201 and 1202. Sample 1202 contains a standard particle with a 170 nm core and a poly(NIPAM-co-AAc) shells of 265 nm thickness. Sample 1201 is a mixed particle composition that includes uncoated particles, as well as particles with the standard particle. The presence of the uncoated particles increases the disorder, while decreasing inter-scatterer distances and the observed color is shifted to the blue. FIG. 12B shows reflection spectra and corresponding photographs of photonic balls for three different samples 1211, 1212, and 1213. Sample 1211 contains a standard particle with a 170 nm core and a poly(NIPAM-co-AAc) shells of 140 nm thickness. Sample 1212 contains a standard particle with a 170 nm core and shells of 530 nm thickness. Sample 1213 contains a standard particle with a 170 nm core and shells of 730 nm thickness. It is clear that the increase in shell thickness sets longer inter-scatterer distances, resulting in the red-shift in structural colors.

To elucidate the origin of these colors centrifugation was used to make disordered packings where the particle cores were far enough apart to image optically but close enough together to give rise to a resonance within the wavelength range of our spectrometer. The particles had hydrodynamic core 120 and shell 125 diameters ($\delta$, d)=(180 nm, 940 nm). The average interparticle spacing 200 was determined from the confocal images and from the spectral data shown in FIGS. 13A and B (with curves corresponding to 180 nm diameter core, including inset 1311 in FIG. 13B). The azimuthal average of the power spectrum of a confocal image stack (FIG. 13A) has a peak at $q_{peak}$=20.3±2.4 µm$^{-1}$, corresponding to a length scale $\alpha_{confocal}$=2$\pi$/$q_{peak}$=310±36 nm. This sample has a resonance at $\lambda_r$=765 nm (1311).

The resonances are expected to occur when the wavelength is comparable to the structural lengthscale, assuming that light is singly scattered and that the suspension behaves as an effective medium with an average index of refraction that depends on the volume fraction of the particles. Under these conditions, the magnitude of the incident wavevector at resonance should be equal to $q_{peak}$:

$$4\pi n/\lambda_r = 2\pi/\alpha_r = q \tag{2}$$

where n is the effective refractive index of the medium (the shell layer 125 and possible surrounding liquid medium 115, if index matched), $\alpha_r$ the average interparticle spacing 200, and we have assumed normal incidence. We calculate the effective index from the Maxwell-Garnett relation, assuming that the index of the swollen poly(NIPAM-co-AAc) shells 125 is the same as that of water:

$$n = n_{water}\sqrt{\frac{2n_{water}^2 + n_{PS}^2 + 2\phi(n_{PS}^2 - n_{water}^2)}{2n_{water}^2 + n_{PS}^2 - \phi(n_{PS}^2 - n_{water}^2)}} \tag{3}$$

where $n_{PS}$ is the refractive index of polystyrene and ø is the volume fraction of polystyrene. From the interparticle spacing 200 determined from the confocal images and the measured hydrodynamic diameter of the particle cores, we estimate the volume fraction of polystyrene to be ø=0.10±0.03. This leads to an effective index of n=1.35±0.01. From Equation (2) we estimate the interparticle spacing to be $\alpha_r$=283±3 nm. The two values for the interparticle spacing 200, $\alpha_{confocal}$=310±36 nm and $\alpha_r$=283±3 nm, are in good agreement, considering that the measured interparticle distance 200 is close to the diffraction limit. Thus the data are consistent with a model which assumes that the resonance arises from constructive interference of waves scattered from neighboring particle cores 120.

Example 2

The transparency of the color resulting from photonic balls 110 can be varied by changing the size of the cores 120 while keeping the inter-particle spacing the same 200.

Figure 13A:
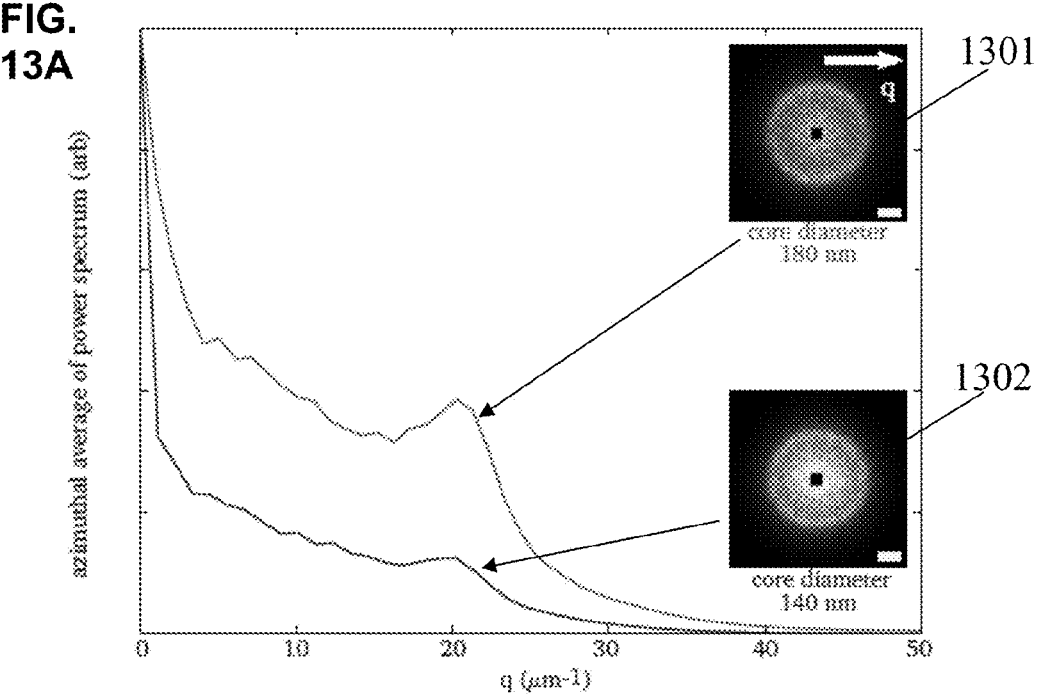
FIG. 13A shows azimuthal averages of the power spectra of a z-stack of confocal images taken for two amorphous aggregates of core-shell particles, according to one or more embodiments. The depth of the stack was 6 μm in both cases. The 2D power spectra are shown in the insets, where the values are masked around zero spatial frequency and a threshold is set to the dynamic range of the image for better contrast. The bars are 10 $\mu m^{-1}$. The hydrodynamic core and shell diameters are $(\delta, d)=(180$ nm, 940 nm) for the upper curve and (140 nm, 1400 nm) for the lower curve. The samples have a peak in spatial frequency at 20.3 $\mu m^{-1}$ (upper curve) and 20.2 $\mu m^{-1}$ (lower curve).
Figure 13B:
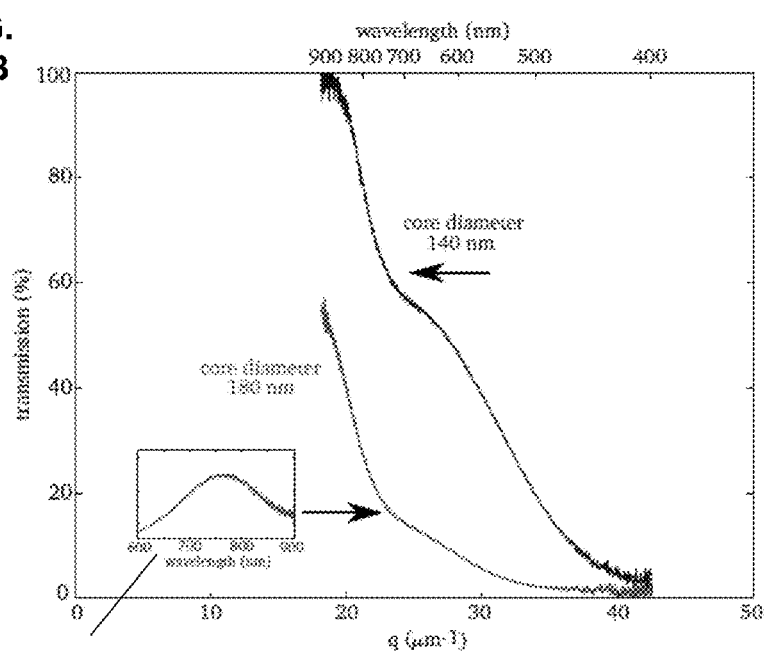
FIG. 13B shows transmission spectra through the samples shown in FIG. 13A as a function of wavelength (upper x-axis) and wavevector q (lower x-axis), according to one or more embodiments. The values for q were calculated using n=1.35. The sample thickness was about 130 μm in both cases. Inset: $-\ln T/\sigma_s$ (see text).

To explore the effect of changing the scattering cross-section of the particles 110, disordered packings were made using particles with the same inter-scatterer spacings 200 but different core 120 diameters. FIGS. 13A and 13B show confocal (A) and spectral (B) data from two centrifuged suspensions with the same thickness. (The 2D power spectra, 1301 and 1302, in FIG. 13A are shown in the insets, where the values around zero spatial frequency are masked and a threshold to the dynamic range of the image is set for better contrast.) One sample contained particles with hydrodynamic 120 core and shell 125 diameters ($\delta$, d)=(180 nm, 940 nm) and the other with ($\delta$, d)=(140 nm, 1400 nm). Although the shell diameters differed, it was possible to make dense suspensions with similar interparticle spacings through centrifugation. Indeed, both samples have peaks in their power spectra at similar wavevectors: $q_{peak}$=20.2±2.3 µm$^{-1}$ for the sample with the smaller cores and $q_{peak}=20.3\pm2.4\ \mu m^{-1}$ for the sample with the larger cores. As a result, they have similar optical resonances: $\lambda=740$ nm and $\lambda=765$ nm. However, changing the core diameter leads to a noticeable change in the transmitted intensity: the sample with the smaller cores is much more transparent than the sample with the larger cores. Thus for a given sample thickness the degree of transparency, which is expected to correlate with the color saturation, can be changed independently of the resonant wavelength.

Example 3

Figure 14A:
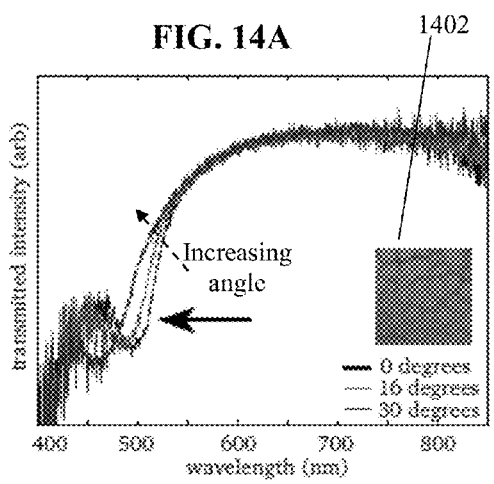
FIGS. 14A and 14B show transmission spectra through core-shell suspensions in which the particles have crystallized A and the particles have formed a disordered packing B, according to one or more embodiments. Both samples were prepared using a depletion attraction. The crystalline sample was prepared from a monodisperse suspension of particles with hydrodynamic core and shell diameters (δ, d)=(180 nm, 430 nm), whereas the amorphous sample was prepared from a bidisperse suspension of particles with hydrodynamic core and shell diameters (δ, d)=(180 nm, 430 nm) and (180 nm, 640 nm). Insets show photographs of the samples with a 2 mm×2 mm field of view.
Figure 14B:
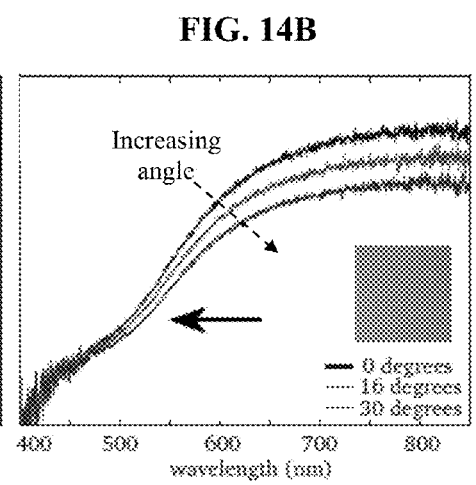

For comparison and to demonstrate the importance of disorder for the optical properties, both crystalline and disordered samples were made by introducing a depletion attraction between the particles (as shown in FIGS. 14A and 14B). To make the crystalline sample a monodisperse suspension of core-shell particles 110 with ($\delta$, d)=(180 nm, 430 nm) was used, as shown in FIG. 14A. The resulting sample, shown in the inset 1402, has cracks that form at well-defined angles, indicating facets and crystalline order. A sample prepared in the same way but from a bidisperse suspension of core-shell particles with ($\delta$, d)=(180 nm, 430 nm) and (180 nm, 640 nm), where the number ratio of smaller to larger particles was about 3:1, shows a resonance at a similar wavelength at normal incidence but with a different angular dependence, as seen in FIG. 14B. Whereas the resonance of the crystalline sample moves from cyan towards purple as the angle of illumination increases (FIG. 14A), in the amorphous sample it does not deviate from its value at normal incidence (FIG. 14B).

Example 4

Figure 15:
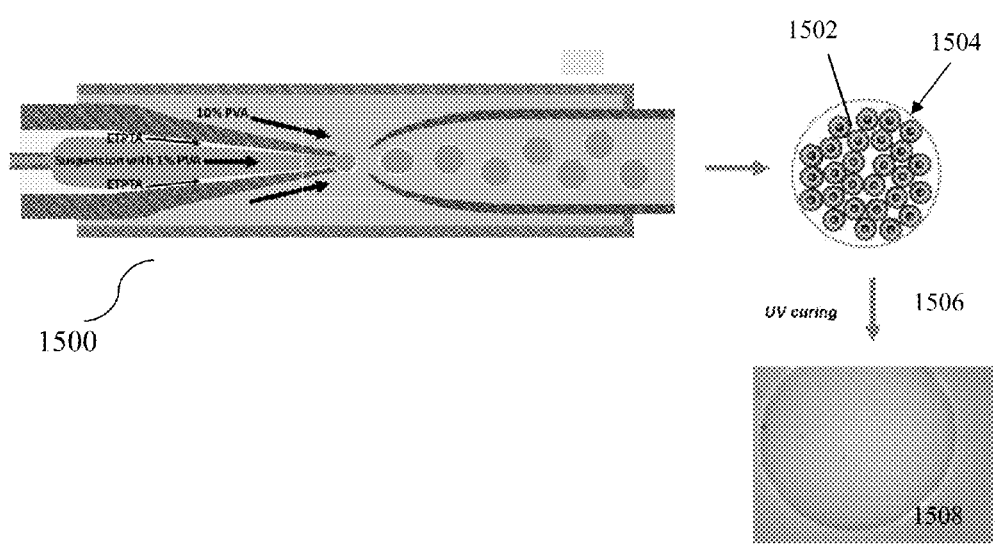
FIG. 15 is a schematic of a fabrication process of photonic droplets through microfluidic W/O/W (water-in-oil-in-water) emulsification, according to one or more embodiments.

Microfluidics was used to make photonic balls 100 as shown in FIG. 15. This is based on the use of a double-walled capillary devices 1500 to make multiple emulsion droplets. (The details of this technique can be found in Shin-Hyun Kim, et. al, "Double-emulsion drops with ultra-thin shells for capsule templates", Lab Chip, 2011, 11, 3162.) In this case, the droplets have water-in-oil-in-water structures. The most inner water is aqueous suspension of core-shell particles 1502, and the oil phase is UV-curable monomer 1504. These droplets are stable in water. The droplets contain densely packed core-shell particles that show structural colors. The 'oil' layer is solidified by putting the droplet under UV light 1506. After curing, no water can be transported through the cured wall 1508. The color is controlled by changing the diameter of core-shell particles.

The examples demonstrated certain embodiments in which materials with structural colors were created by packing soft, core-shell colloidal particles 110. The systems allowed independent control of the colors and the color transparency. One may consider broadening the range of colors that can be obtained. The absence of purely structural, angle-independent, saturated color with wavelength larger than about 550 nm is common to all amorphous photonic systems, including bird feathers. This effect may be related to the dependence of the scattering cross-section on wavelength. Elucidation of how this dependence affects the transport of light through the medium may reveal design criteria that can be used to make materials with a wider range of angle independent structural colors.

The method of generating structural color by packing core-shell particles 110 has many potential applications, including electronic displays, long-lasting dyes, or cosmetics. Isotropic structural colors have several advantages over chemical pigments for these applications: because they do not absorb energy, they do not heat or bleach, and in principle the colors can be tuned over a wide range simply by changing the structure. Moreover, since the hydrogel poly(NIPAM-co-AAc) shells 125 respond to changes in water concentration, temperature, and pH, they can be the precursor to materials with switchable optical properties (e.g. ones that change shell thickness and thus color).

It will be appreciated that while a particular sequence of steps has been shown and described for purposes of explanation, the sequence may be varied in certain respects, or the steps may be combined, while still obtaining the desired configuration. For example, each of the individual features of the photonic droplet described herein may be combined with any other feature or embodiment as would be apparent to one of skill in the art. Furthermore, the invention has been described by exemplifying enhancement of red color response. The principles described herein can be equally applied to obtain improved colored response for any desired wavelength. The disclosure also contemplates the enhancement of other wavelengths outside of the visible, such as UV and IR. Additionally, modifications to the disclosed embodiment and the invention as claimed are possible and within the scope of this disclosed invention.

What is claimed is:

1. A photonic assembly, comprising:
    a liquid droplet, dispersed in a carrier liquid, said liquid droplet comprising a plurality of colloidal particles, each colloidal particle comprising a light-scattering core surrounded by a first shell layer,
    wherein the plurality of colloidal particles is arranged with short-range order within the liquid droplet, wherein each of the colloidal particles has short-range order with up to a fifth neighbor colloidal particle, the plurality of colloidal particles being arranged without long-range order, wherein the plurality of colloidal particles is packed into the liquid droplet such that there is no observable Brownian motion in the liquid state, and
    wherein an observed color of the photonic assembly upon incidence of ambient light is determined at least in part by the short-range order and is independent of an angle from which the photonic assembly is viewed.

2. The photonic assembly of claim 1, wherein the angular independence is observed from an incidence angle between 60° and 180°.

3. The photonic assembly of claim 1, wherein each of the colloidal particles has short-range order with up to a second neighbor colloidal particle.

4. The photonic assembly of claim 1, wherein each of the colloidal particles has short-range order only with a first neighbor colloidal particle.

5. The photonic assembly of claim 1, wherein the observed color is in visible, infrared, or ultraviolet spectrum.

6. The photonic assembly of claim 1, wherein the observed color is determined by a diameter of the core and a thickness of the first shell layer.

7. The photonic assembly of claim 1, wherein the first shell layer has a thickness selected to provide interparticle scattering center-to-center distances for constructive interference of incident light within a first range of scattered wavelengths or for destructive interference of incident light within a second range of scattered wavelengths.

8. The photonic assembly of claim 1, wherein the first shell layer has a thickness selected to enhance scattering in a red portion of the visible spectrum.

9. The photonic assembly of claim 1, wherein the first shell layer has a thickness selected to suppress scattering in a blue portion of the visible spectrum.

10. The photonic assembly of claim 1, wherein the light-scattering cores have a diameter selected to provide a predetermined degree of opacity to the observed color.

11. The photonic assembly of claim 1, wherein the light-scattering cores have a diameter in a range of about 80 nm to about 250 nm.

12. The photonic assembly of claim 1, wherein the colloidal particles have an overall dimension in the range of about 200 nm to about 1000 nm.

13. The photonic assembly of claim 1, wherein the liquid droplet is a droplet in an emulsion suspension.

14. The photonic assembly of claim 13, wherein the emulsion is a water-in-oil emulsion.

15. The photonic assembly of claim 1, wherein the liquid droplet has a diameter that is about 20 colloidal particle diameters.

16. The photonic assembly of claim 1, wherein the colloidal particles are dispersed in a dispersion liquid, wherein an index of refraction of the first shell layer is index matched with the dispersion liquid, such that there is no scatter of light at an interface between the carrier liquid and the shell layer.

17. The photonic assembly of claim 1, wherein the first shell layer is surrounded by a second shell layer.

18. The photonic assembly of claim 17, wherein each of the light-scattering core diameter, the first shell layer thickness, and the second shell layer thickness is selected to enhance or suppress scattering of a selected range of wavelengths, wherein the second shell layer is transparent to incident light.

19. A color display, comprising:
a plurality of pixels arranged on a surface, each said pixel arranged as the photonic assembly according to claim 1.

20. The color display of claim 19, wherein the first shell layer has a thickness selected to provide interparticle core scattering center-to-center distances for constructive interference of incident light with a range of scattered wavelengths.

21. A method of generating an observable color on a surface, comprising:
providing the photonic assembly according to claim 1 on the surface;
exposing the surface to ambient light; and
observing color on the surface, wherein the observed color of the photonic assembly is independent of the angle from which the photonic assembly is viewed.

22. A method of making a photonic assembly, comprising:
coating each of a plurality of light-scattering cores with a first shell layer to obtain a plurality of colloidal particles; and
packing the plurality of colloidal particles in a dispersion liquid to obtain a liquid droplet, wherein the plurality of colloidal particles is arranged with short-range order within the liquid droplet, wherein each of the colloidal particles has short-range order with up to a fifth neighbor colloidal particle, the plurality of colloidal particles being arranged without long-range order, wherein the plurality of colloidal particles is packed into the liquid droplet such that there is no observable Brownian motion in the liquid state,
wherein an observed color of the photonic assembly upon incidence of ambient light is determined at least in part by the short-range order and is independent of an angle from which the photonic assembly is viewed.

* * * * *